Patented Apr. 2, 1929.

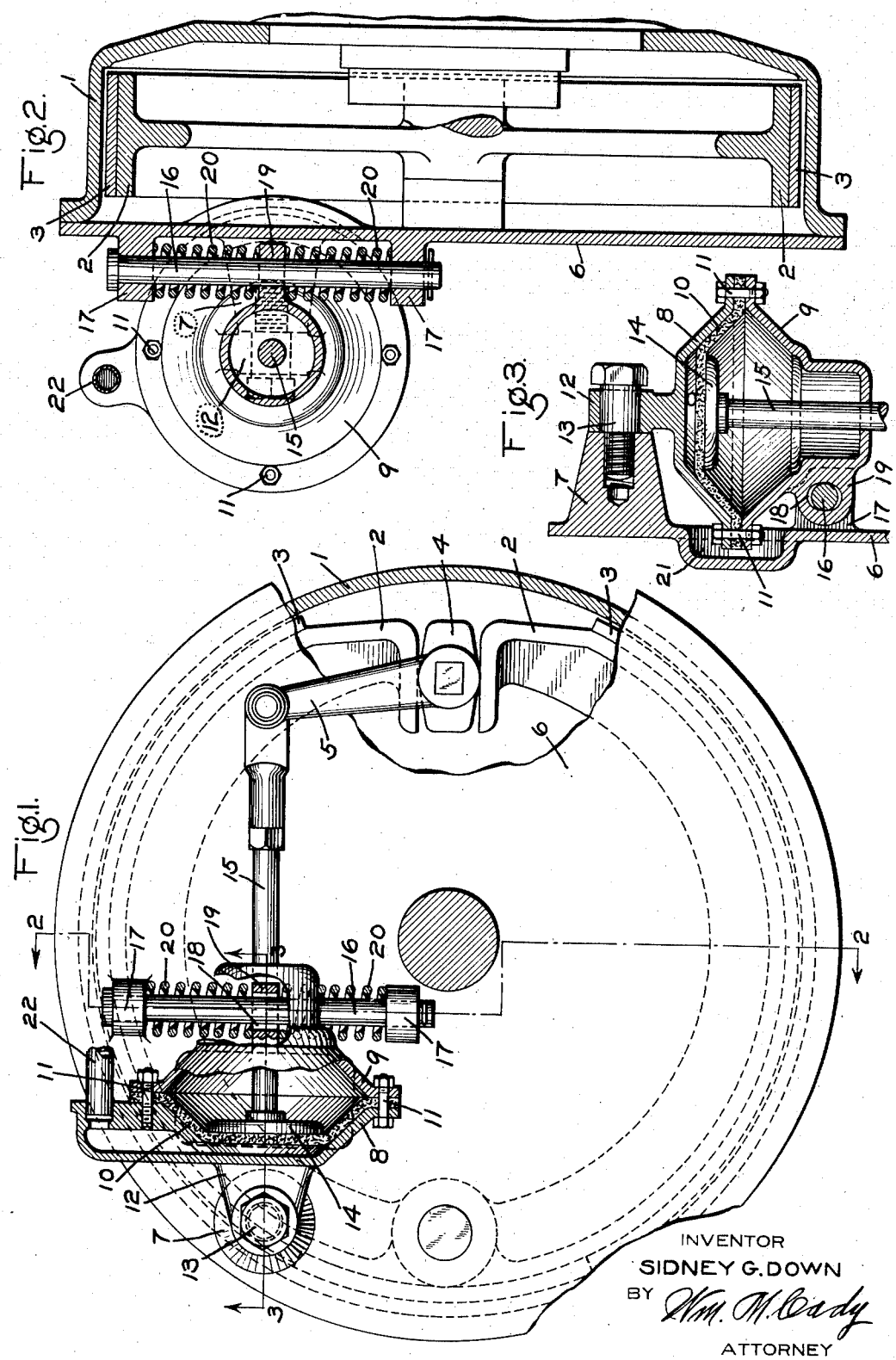

1,707,258

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE.

Application filed November 13, 1925. Serial No. 68,847.

This invention relates to brakes, and more particularly to a brake construction adapted for use on motor vehicles.

The principal object of my invention is to provide an improved motor vehicle brake construction, adapted especially to be applied to brake the front wheels of the vehicle.

In the accompanying drawing; Fig. 1 is a face view of an internal expanding drum type of brake, with my invention embodied therein; Fig. 2 a section on the line 2—2 of Fig. 1; and Fig. 3 a section on the line 3—3 of Fig. 1.

The brake construction shown in the drawing comprises a brake drum 1, having an internal friction face and having mounted therein, brake heads 2, which are provided with brake shoes 3, adapted, when the brake heads are expanded, to frictionally engage the internal friction face of the drum 1.

The brake heads 2 are pivotally connected together at one side and a cam 4 is interposed between the free ends of the brake heads. An arm 5 is connected to said cam, so that by rocking the arm, the cam 4 is rotated to thereby effect an expansive movement of the brake heads 2.

A cover plate 6 is applied to the open side of the brake drum and according to my invention, said plate is provided with a boss 7, on which a brake chamber is pivotally mounted. Said brake chamber may comprise flanged casing sections 8 and 9, having a flexible diaphragm 10 clamped between the flanges of the sections by means of bolts 11. The casing section 8 is provided with a lug 12 adapted to engage the face of the boss 7 and having a bore for receiving a pivot pin 13 having screw-threaded engagement in the boss 7.

Secured to a pressure plate 14, which bears against the diaphragm 10 is a rod 15, which extends out through an opening in the casing section 9 and is pivotally connected to the arm 5.

Disposed transversely of the rod 15 is a pin 16 having bearings in lugs 17 which are carried by the cover plate 6, and said pin extends through an elongated opening 18 provided in a lug 19 which is carried by the casing section 9. A coil spring 20 is interposed between the lug 19 and each of the lugs 17 and each spring surrounds the pin 16.

In order to provide clearance space for the brake chamber, the cover plate 6 may be formed with a cavity or depression 21, as shown in Fig. 3. When fluid under pressure is supplied through pipe 22 to the chamber at the pressure side of the diaphragm 10, said diaphragm is forced outwardly, causing the outward movement of the rod 15 and the rocking of the arm 5, so that the cam 4 is operated to expand the brake heads 2 and thus cause the brake shoes 3 to frictionally engage the brake drum 1.

When the rod 15 is moved outwardly in applying the brakes and inwardly in releasing the brakes, angular movement of the rod and the brake chamber, due to the arcuate movement of the arm 5, is permitted, by reason of the pivotal mounting of the brake chamber, and the elongation of the opening 18 in the lug 19 also permits such angular movement without causing any binding action of the pin 16 in the lug 19. At the same time, the pin 16 being adapted to fit snugly within the opening 18 in a direction at right angles to the elongation, assists in supporting the brake chamber and in maintaining the same in proper alinement.

The springs 20 act to steady the brake chamber and prevent rattling thereof, and also tend to maintain the brake chamber in normal release position.

Having now described my invention, what I claim as new and desire to secure by Letters Patent, is:—

1. In a vehicle brake, the combination with a brake drum containing brake members and having a cover plate, of a fluid pressure brake chamber pivotally mounted on said cover plate and operatively connected to said brake members and springs disposed at right angles to the working axis of said brake chamber for opposing rotative movement of said brake chamber.

2. In a vehicle brake, the combination with a brake drum containing brake members and having a cover plate, of a brake chamber pivotally mounted on said plate and operatively connected to said members, a depending lug carried by said chamber, lugs carried by said cover plate, and springs interposed between said depending lug and said cover plate lugs for yieldingly opposing rotative movement of said brake chamber.

3. In a vehicle brake, the combination with a brake drum containing brake members and having a cover plate, of a brake chamber pivotally mounted on said plate and operatively connected to said members, a lug carried by said brake chamber, and a pin mounted on said cover plate and extending through an opening in said lug.

4. In a vehicle brake, the combination with a brake drum containing brake members and having a cover plate, of a brake chamber pivotally mounted on said plate and operatively connected to said members, a lug carried by said brake chamber, a pin carried by said cover plate and extending through an opening in said lug, and a spring engaging said lug for yieldingly opposing rotative movement of said brake chamber.

5. In a vehicle brake, the combination with a brake drum containing brake members and having a cover plate, of a brake chamber pivotally mounted on said plate and operatively connected to said members, a lug carried by said brake chamber, a pin carried by said cover plate and extending through an elongated opening in said lug, and a spring engaging said lug to yieldingly oppose rotative movement of said brake chamber and to assist in supporting same.

In testimony whereof I have hereunto set my hand.

SIDNEY G. DOWN.